(12) United States Patent
Koh et al.

(10) Patent No.: US 9,727,382 B2
(45) Date of Patent: Aug. 8, 2017

(54) PARALLELIZATION METHOD AND ELECTRONIC DEVICE BASED ON PROFILING INFORMATION

(71) Applicant: Samsung Electronics Co., Ltd., Gyeonggi-do (KR)

(72) Inventors: Jaehan Koh, Seoul (KR); Anuradha Oberoi, Karnataka (IN); GopalaKrishna Puligedda Sharma, Bangalore (IN); Raghavan Velappan, Bangalore (IN); Priyank Popatlal Faldu, Gujarat (IN)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 90 days.

(21) Appl. No.: 14/789,062

(22) Filed: Jul. 1, 2015

(65) Prior Publication Data
US 2016/0004570 A1    Jan. 7, 2016

(30) Foreign Application Priority Data

Jul. 1, 2014    (KR) .................. 10-2014-0082039

(51) Int. Cl.
| | | |
|---|---|---|
| *G06F 9/46* | (2006.01) | |
| *G06F 9/44* | (2006.01) | |
| *G06F 9/50* | (2006.01) | |
| *G06F 9/48* | (2006.01) | |

(52) U.S. Cl.
CPC .......... *G06F 9/5044* (2013.01); *G06F 9/4843* (2013.01); *Y02B 60/142* (2013.01); *Y02B 60/144* (2013.01)

(58) Field of Classification Search
CPC ................ G06F 9/4843; G06F 9/5044; G06F 11/3636; Y02B 60/142; Y02B 60/144
USPC ................................... 718/104; 717/124–135
See application file for complete search history.

(56) References Cited

U.S. PATENT DOCUMENTS

| | | | | |
|---|---|---|---|---|
| 2003/0120701 A1* | 6/2003 | Pulsipher | .............. | G06F 9/4843 718/102 |
| 2009/0110316 A1* | 4/2009 | Tseng | ..................... | H04N 19/60 382/250 |
| 2010/0235845 A1* | 9/2010 | Bates | .................... | G06F 9/5044 718/105 |
| 2012/0185864 A1* | 7/2012 | Toukmaji | .............. | G06F 9/4881 718/104 |
| 2012/0218442 A1* | 8/2012 | Jandhyala | ................. | G06T 7/20 348/239 |

(Continued)

*Primary Examiner* — Qing Chen
(74) *Attorney, Agent, or Firm* — Cha & Reiter, LLC (57) ABSTRACT

A parallelization method includes: obtaining profiling information for each job step of a job by performing profiling of the job to be executed on an electronic device; determining at least one job step to be parallelized on a central processing unit (CPU) and at least one heterogeneous unit of the electronic device among a plurality of job steps of the job based on the profiling information; determining a unit to process each unit data among the CPU and the heterogeneous unit based on the profiling information, with respect to the determined at least one job step; and determining a unit to process each task among the CPU and the heterogeneous unit based on the profiling information, with respect to at least one job step including a plurality of separately executable tasks in the determined at least one job step.

19 Claims, 7 Drawing Sheets

(56) References Cited

U.S. PATENT DOCUMENTS

2013/0074077 A1* 3/2013 Miller ................ G06F 1/3203
 718/100
2013/0322532 A1  12/2013 Efremov et al.

* cited by examiner

PARALLELIZATION METHOD AND ELECTRONIC DEVICE BASED ON PROFILING INFORMATION

CLAIM OF PRIORITY

This application claims the benefit under 35 U.S.C. §119 (a) of the Korean patent application filed on Jul. 1, 2014 in the Korean Intellectual Property Office and assigned Serial number 10-2014-0082039, the entire disclosure of which is hereby incorporated by reference.

TECHNICAL FIELD

The present disclosure relates to a parallelization method and an electronic device.

BACKGROUND

Recently, mobile electronic devices such as smartphones and tablet personal computers (PCs) provide high-quality graphic functions or high-specification image processing functions. Accordingly, mobile electronic devices may support increased data calculation amounts by using parallelization available multi core Central Processing Units (CPUs). An electronic device may process increased data calculation amounts as the calculation processing speed of a CPU is increased by increasing its clock frequency. However, due to heat issues and limited amounts of power in a mobile electronic device, there may be limitations to increasing the CPU clock frequency. Accordingly, minimizing the amount of heat and power consumption while supporting high performance and fast speed in an electronic device can be beneficial.

SUMMARY

Accordingly, an embodiment of the present disclosure is to provide a parallelization method and an electronic device.

Another embodiment of the present disclosure is to provide a computer readable recording medium for executing the parallelization method on a computer.

In accordance with an embodiment of the present disclosure, a parallelization method includes: obtaining profiling information for each job step of a job by performing profiling of the job to be executed on an electronic device; determining at least one job step to be parallelized on a central processing unit (CPU) and at least one heterogeneous unit of the electronic device among a plurality of job steps of the job based on the profiling information; determining units to process each unit data among the CPU and the heterogeneous unit based on the profiling information, with respect to the determined at least one job step; and determining units to process each task among the CPU and the heterogeneous unit based on the profiling information, with respect to at least one job step including a plurality of separately (or in isolation) executable tasks in the determined at least one job step.

In accordance with another embodiment of the present disclosure, an electronic device includes: a central processing unit (CPU) configured to process at least part of unit data and executed at least part of a task determined to be processed on the CPU in at least one step to be parallelized, which is determined based on profiling information for each job step; and at least one heterogeneous unit configured to execute at least part of unit data and at least part of a task determined to be processed on a heterogeneous unit in the at least one step to be parallelized, wherein at least part of a task executed on each of the CPU and the heterogeneous unit is determined with respect to at least one job step including a plurality of separately (or in isolation) executable tasks in the determined at least one job step to be parallelized.

DETAILED DESCRIPTION

Hereinafter, various embodiments of the present disclosure are disclosed with reference to the accompanying drawings. Various modifications are possible in various embodiments of the present disclosure and specific embodiments are illustrated in drawings and related detailed descriptions are listed. However, this does not limit various embodiments of the present disclosure to a specific embodiment and it should be understood that the present disclosure covers all the modifications, equivalents, and/or replacements of this disclosure provided they come within the scope of the appended claims and their equivalents. With respect to the descriptions of the drawings, like reference numerals refer to like elements.

The term "include," "comprise," and "have", or "may include," or "may comprise" and "may have" used herein indicates disclosed functions, operations, or existence of elements but does not exclude other functions, operations or elements. Additionally, in various embodiments of the present disclosure, the term "include," "comprise," "including," or "comprising," specifies a property, a region, a fixed number, a step, a process, an element and/or a component but does not exclude other properties, regions, fixed numbers, steps, processes, elements and/or components.

In various embodiments of the present disclosure, expression "A or B" or "at least one of A or/and B" may include all possible combinations of items listed together. For instance, the expression "A or B", or "at least one of A or/and B" may indicate include A, B, or both A and B.

The terms such as "1st", "2nd", "first", "second", and the like used herein may refer to modifying various different elements of various embodiments of the present disclosure, but do not limit the elements. For instance, such expressions do not limit the order and/or importance of corresponding components. The expressions may be used to distinguish one element from another element. For instance, both "a first user device" and "a second user device" indicate a user device but indicate different user devices from each other. For example, a first component may be referred to as a second component and vice versa without departing from the scope of the present disclosure.

In this disclosure below, when one part (or element, device, etc.) is referred to as being "connected" to another part (or element, device, etc.), it should be understood that the former can be "directly connected" to the latter, or "connected" to the latter via an intervening part (or element, device, etc.). In contrast, when an element is referred to as being "directly connected" or "directly coupled" to another element, there are no intervening elements present.

In various embodiments of the present disclosure, terms used in this specification are used to describe specific embodiments, and are not intended to limit the scope of the present disclosure. The terms of a singular form may include plural forms unless they have a clearly different meaning in the context. Unless otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning.

For instance, electronic devices may include at least one of smartphones, tablet personal computers (PCs), mobile phones, video phones, electronic book (e-book) readers, desktop personal computers (PCs), laptop personal computers (PCs), netbook computers, personal digital assistants (PDAs), portable multimedia player (PMPs), MP3 players, mobile medical devices, cameras, and wearable devices (for example, head-mounted-devices (HMDs) such as electronic glasses, electronic apparel, electronic bracelets, electronic necklaces, electronic appcessories, electronic tattoos, and smart watches).

According to some embodiments of the present disclosure, an electronic device may be smart home appliances. The smart home appliances may include at least one of, for example, televisions, digital video disk (DVD) players, audios, refrigerators, air conditioners, cleaners, ovens, microwave ovens, washing machines, air cleaners, set-top boxes, TV boxes (for example, Samsung HomeSync™, Apple TV™ or Google TV™), game consoles, electronic dictionaries, electronic keys, camcorders, and electronic picture frames.

According to some embodiments of the present disclosure, an electronic device may include at least one of various medical devices (for example, magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, vehicle head modules, industrial or household robots, financial institutions' automatic teller machines (ATMs), and stores' point of sales (POS).

According to some embodiments of the present disclosure, an electronic device may include at least one of furniture or buildings/structures, electronic boards, electronic signature receiving devices, projectors, and various measuring instruments (for example, water, electricity, gas, or radio signal measuring instruments). An electronic device according to various embodiments of the present disclosure may be one of the above-mentioned various devices or a combination thereof. Additionally, an electronic device according to various embodiments of the present disclosure may be a flexible device. Furthermore, it is apparent to those skilled in the art that an electronic device according to various embodiments of the present disclosure is not limited to the above-mentioned devices.

Hereinafter, an electronic device according to various embodiments of the present disclosure will be described in more detail with reference to the accompanying drawings. The term "user" in various embodiments of the present disclosure may refer to a person using an electronic device or a device using an electronic device (for example, an artificial intelligent electronic device).

Figure 1:
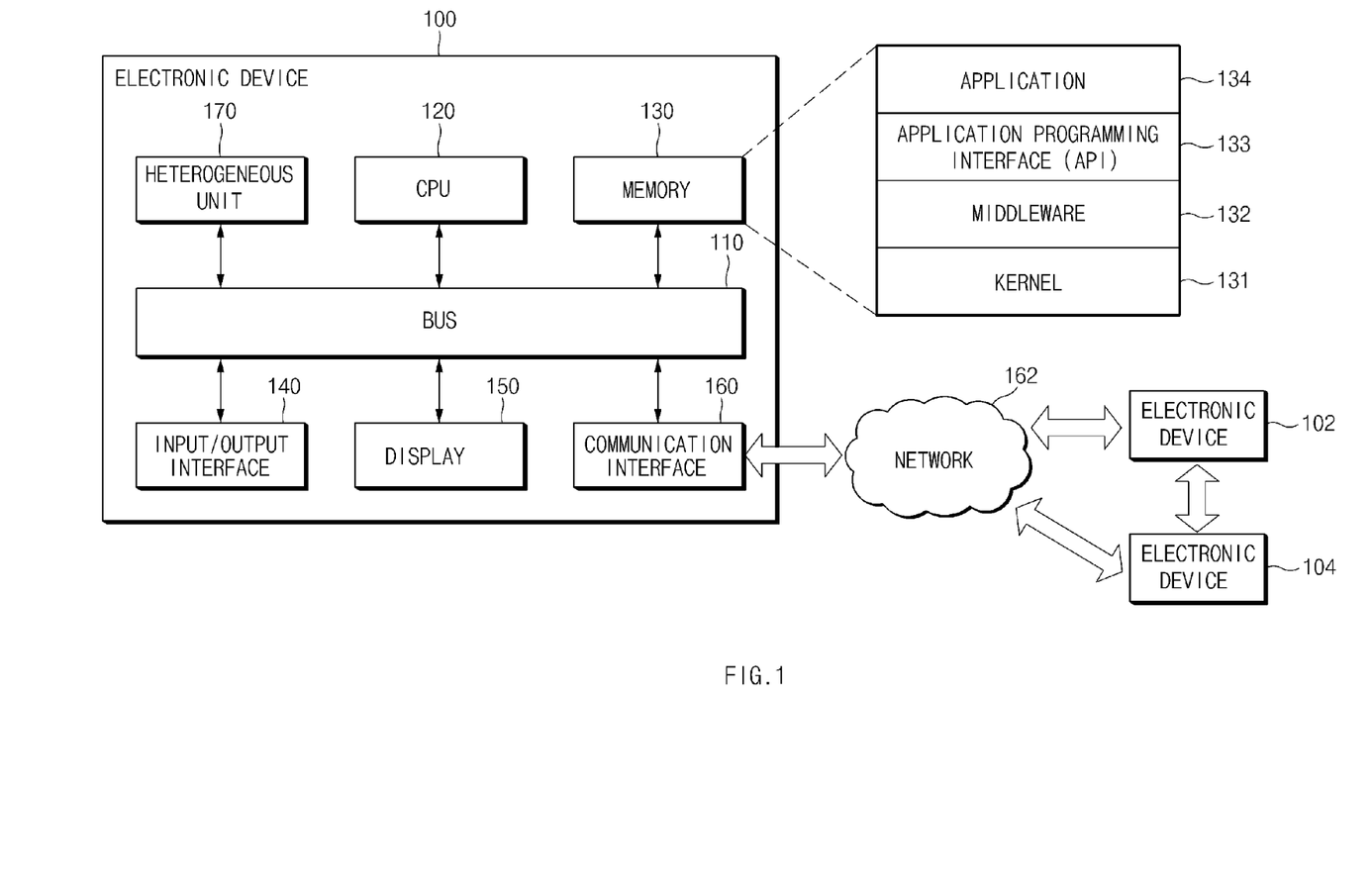
FIG. 1 is a block diagram illustrating an electronic device according to various embodiments of the present disclosure.

FIG. 1 is a block diagram illustrating an electronic device according to various embodiments of the present disclosure.

Referring to FIG. 1, the electronic device 100 may include at least one of a bus 110, a central processing unit (CPU) 120, a memory 130, an input/output interface 140, a display 150, a communication interface 160, and a heterogeneous unit 170.

The electronic device 100 may execute a job by parallelizing the job in the CPU 120 and the heterogeneous unit 170 different therefrom. The electronic device 100 may parallelize the job by each job step through a profiling for each job step. The electronic device 100 may parallelize part of code of a job executed on a multi-core CPU to be executed simultaneously on a heterogeneous unit under a heterogeneous environment.

The bus 110 may be a circuit connecting the above-mentioned components to each other and delivering a communication (for example, a control message) between the above-mentioned components. According to various embodiments of the present disclosure, the bus 110 may connect between the CPU 120 and the heterogeneous unit 170 and/or between the above-mentioned components (for example, the memory 130, the input/output interface 140, the display 150, the communication interface 160, and the heterogeneous unit 170) to deliver communication therebetween.

The CPU 120 may execute at least one job step to be parallelized, which is determined based on profiling information for each job step. For example, the profiling information may include at least one of an execution time of the job, an execution time for the each job step, a code range executed for the each job step, and a memory amount used for execution for the each job step.

For example, when the job is a high dynamic range (HDR) job, the CPU 120 may execute at least one of an image registration job step and an HDR composition job step among a plurality of job steps for the HDR job in parallelization with the heterogeneous unit 170. Alternatively, when the job is a JPEG decoding job, the CPU 120 may execute at least one of a dequantization job step and an inverse discrete cosine transform (IDCT) job step among a plurality of job steps for the JPEG decoding job in parallelization with the heterogeneous unit 170.

The CPU 120 may process at least a part of unit data and at least part of a task, which are determined to be processed on the CPU 120, of at least one parallelized job step determined based on profiling information for each job step.

According to an embodiment of the present disclosure, at least part of unit data processed by the CPU 120 may be parallelized and the unit data may be determined with respect to at least one job step repeated for a plurality of unit data in a determined job step.

According to another embodiment of the present disclosure, at least part of a task executed on the CPU 120 may be parallelized and the task may be determined with respect to at least one job step including a plurality of separately (or isolatedly) executable tasks in a determined job step.

The CPU 120 may receive an instruction from the above-mentioned other components (for example, the memory 130, the input/output interface 140, the display 150, the communication interface 160, and the heterogeneous unit 170) through the bus 110. The CPU 120 may interpret the received instruction and may perform calculation or data processing according to the interpreted instruction.

The CPU 120 according to this embodiment of the present disclosure may be configured with at least one core.

The memory 130 may store instructions or data received or generated from the CPU 120 or other components (for example, the input/output interface 140, the display 150, the communication interface 160, and the heterogeneous unit 170).

According to various embodiments of the present disclosure, the memory 130 may store profiling information for each job step of a job. Additionally, the memory 130 may store at least one job step to be parallelized on the CPU 120 of the electronic device 100 and the heterogeneous unit 170 different therefrom among a plurality of job steps relating to the job. The memory 130 may store at least part of unit data or at least part of a task, which are executed on each of the CPU 120 and the heterogeneous unit 170, among the at least one parallelized job step.

The memory 130 may store data or programs (for example, source code) necessary for executing a plurality of job steps of a job on each of the CPU 120 and the heterogeneous unit 170. Additionally, the memory 130 may further store data or programs necessary for executing at least part of unit data or at least part of a task on each of the CPU 120 and the heterogeneous unit 170.

The memory 130 may store program routines or instruction sets necessary for controlling the heterogeneous unit 170, the communication interface 160, or the input/output interface 140 through the CPU 120.

The memory 130 may store data or programs necessary for an operation of the electronic device 100. For example, the memory 130 may include Hard Disk Drive (HDD), Read Only Memory (ROM), Random Access Memory (RAM), Flash Memory, Memory Card, NAND memory, or Solid State Drive (SDD).

The memory 130, for example, may include programming modules such as a kernel 131, a middleware 132, an application programming interface (API) 133, or an application 134. The above-mentioned each programming module may be configured with software, firmware, hardware, or a combination of at least two thereof. The kernel 131 may control or manage system resources (for example, the bus 110, the CPU 120, and the memory 130) used for executing operations or functions implemented in the remaining other programming modules, for example, the middleware 132, the API 133, or the application 134 or used for calling stored data. Additionally, the kernel 131 may provide an interface for performing a controlling or managing operation by accessing an individual component of the electronic device 100 from the middleware 132, the API 133, or the application 134.

The middleware 132 may serve as an intermediary role for exchanging data as the API 133 or the application 134 communicates with the kernel 231. Additionally, in relation to job requests received from the application 134, the middleware 132, for example, may perform a control (for example, scheduling or load balancing) for the job requests by using a method of assigning a priority for using a system resource (for example, the bus 110, the CPU 120, the heterogeneous unit 170, or the memory 130) of the electronic device 100 to at least one application among the applications 134.

The API 133, as an interface for allowing the application 134 to control a function provided from the kernel 131 or the middleware 132, may include at least one interface or function (for example, an instruction, or an command) for file control, window control, image processing, or character control.

According to various embodiments of the present disclosure, the application 134 may include SMS/MMS applications, e-mail applications, calendar applications, notification applications, health care applications (for example, applications for measuring exercise amount or blood glucose), environmental information applications (for example, applications for providing pressure, humidity, or temperature information), a camera application, an OCR application, an image editing application, a call message application, a memo pad application, an internet application, and so on. Additionally or alternatively, the application 134 may be an application relating to information exchange between the electronic device 100 and an external electronic device (for example, the electronic device 102 or the server 104). The information exchange related application, for example, may include a notification relay application for relaying specific information to the external device or a device management application for managing the external electronic device.

For example, the notification relay application may have a function for relaying to, an external electronic device (for example, the electronic device 102 or the server 103), notification information occurring from another application (for example, an SMS/MMS application, an e-mail application, a health care application, or an environmental information providing application) of the electronic device 100. Additionally or alternatively, the notification relay application may receive notification information from an external electronic device (for example, the electronic device 102 or the server 104) and may then provide the received notification information to a user. The device management application, for example, may manage (for example, install, delete, or update) at least part of a function (turn-on/turn off of the external electronic device itself (or some components) or the brightness (or resolution) adjustment of a display) of an external electronic device (for example, the electronic device 102 or the server 104) communicating with the electronic device 100, an application operating in the external electronic device, or a service (for example, call service or message service) provided from the external device.

According to various embodiments of the present disclosure, the application 134 may include a specified application according to a property (for example, the type of an electronic device) of the external device (for example, the electronic device 102 or the server 104). For example, when an external electronic device is an MP3 player, the application 134 may include an application relating to music playback. Similarly, when an external electronic device is a mobile medical device, the application 134 may include an application relating to heath care. According to an embodiment of the present disclosure, the application 134 may include at least one of an application assigned to the electronic device 100 and an application received from an external device (for example, the electronic device 102 or the server 104).

The input/output interface 140 may deliver an instruction or data inputted from a user through an input/output device (for example, a sensor, a keyboard, or a touch screen) to the CPU 120, the memory 130, the communication interface 160, or the heterogeneous unit 170 through the bus 110. For example, the input/output interface 140 may provide to the CPU 120 data on a user's touch inputted through a touch screen. Additionally, the input/output interface 140 may output, through the input/output device (for example, a speaker or a display), instructions or data received from the CPU 120, the memory 130, the communication interface 160, or the heterogeneous unit 170 through the bus 110. For example, the input/output interface 140 may output voice data processed through the CPU 120 to a user through a speaker.

The input/output interface 140 may include an output device such as a touch screen, a liquid crystal display, a thin film transistor-liquid crystal display, an organic light-emitting diode, a flexible display, a 3D display, a touch screen, or a speaker and a software module for driving it.

The display 150 may display various information (for example, multimedia data or text data) to a user.

The communication interface 160 may connect a communication between the electronic device 100 and an external device (for example, the electronic device 102 or the server device 104). For example, the communication interface 160 may communicate with the external device in connection to the network 162 through wireless communication or wired communication. The wireless communication, for example, may include at least one of wireless fidelity (WiFi), Bluetooth (BT), near field communication (NFC), global positioning system (GPS), and cellular communication (for example, LTE, LTE-A, CDMA, WCDMA, UMTS, WiBro, or GSM). The wired communication, for example, may include at least one of universal serial bus (USB), high definition multimedia interface (HDMI), recommended standard 232 (RS-232), and plain old telephone service (POTS), for example.

According to various embodiments of the present disclosure, the communication interface 160 may receive information on at least one job step determined to be parallelized from the electronic device 102 or the server 104. Alternatively, the communication interface 160 may receive information on at least one of at least part of unit data and at least part of a task. The at least part of the unit data or the at least part of the task may be unit data or a task determined to be executed on each of the CPU 120 and the heterogeneous unit 170 in a job step determined to be parallelized from the electronic device 102 or the server 104.

Alternatively, the communication interface 160 may receive, from the electronic device 102 or the server 104, information on at least one (for example, unit data or a task determined to be executed on each of the CPU 120 and the heterogeneous unit 170 in a job step determined to be parallelized) of at least one part of unit data and at least part of a task.

Then, the communication interface 160 may transmit the information on at least one job step determined to be parallelized to an external device such as the electronic device 102 or the server 104. Alternatively, the communication interface 160 may transmit to, an external device such as the electronic device 102 or the server 104, information on at least part of unit data and at least part of a task determined to be executed on each of the CPU 120 and the heterogeneous unit 170 in the job step determined to be parallelized.

According to an embodiment of the present disclosure, the network 162 may be telecommunications network. The telecommunications network may include at least one of or a combination of a computer network, the internet, internet of things (IoT), and a telephone network. According to an embodiment of the present disclosure, a protocol (for example, transport layer protocol, data link layer protocol, or physical layer protocol) for communication between the electronic device 100 and an external device may be supported by at least one of the application 134, the application programming interface 133, the middleware 132, the kernel 131, the communication interface 160, and the heterogeneous unit 170.

The heterogeneous unit 170 is heterogeneous from the CPU 120 and represents a unit that is parallelized with the CPU 120. For example, the heterogeneous unit 170 may have an architecture different from the CPU 120 and may include different kinds of processors designed to execute a specific task. For example, the heterogeneous unit 170 may include at least one computing processing unit for performing computing. According to various embodiments of the present disclosure, the heterogeneous unit 170 may further include at least one graphics processing unit (GPU) and at least one digital signal processor (DSP). For example, the GPU may achieve the same performance (for example, the same workload processing) with a lower clock frequency than the CPU 120 based on parallel computing platform.

The heterogeneous unit 170 may execute at least one parallelized job step determined based on profiling information for each job step. For example, the heterogeneous unit 170 may execute at least one of at least part of unit data and at least part of a task, which are determined to be processed on the CPU 170, of at least one parallelized job step determined based on profiling information for each job step.

According to an embodiment of the present disclosure, at least part of unit data executed on the heterogeneous unit 170 may be determined with respect to at least one job step repeated on a plurality of unit data in a job step determined to be parallelized.

According to another embodiment of the present disclosure, at least part of a task executed on the heterogeneous unit 170 may be determined with respect to at least one job step including a plurality of separately (or isolatedly) executable tasks in a job step determined to be parallelized.

The heterogeneous unit 170 or the CPU 120 according to this embodiment of the present disclosure may be configured with at least one core. For example, a GPU may include several thousands of cores smaller and more effective than the CPU 120.

The electronic device 102 may perform communication with the electronic device 100 and may transmit data to the electronic device 100. For example, the electronic device 102 may obtain profiling information for each job step of the job through a profiling of a job that is to be executed by the electronic device 100. The electronic device 102 may determine at least one job step to be parallelized on the CPU 120 and the heterogeneous unit 170 among a plurality of job steps based on the profiling information. The electronic device 102 may determine at least part of units to process each unit data among the CPU 120 and the heterogeneous unit 170 based on the profiling information, with respect to at least one job step repeated on a plurality of unit data in the determined job step. The electronic device 102 may determine at least part of units to process each task among the CPU 120 and the heterogeneous unit 170 based on the profiling information, with respect to at least one job step including the plurality of separately (or isolatedly) executable tasks in the determined job step. For example, the electronic device 102 may be a personal computer (PC) (or a laptop, that is, a mobile computing device having a relatively high performance in comparison to the electronic device 100) and the electronic device 100 may be a mobile device.

According to an embodiment of the present disclosure, the electronic device 102 may determine the core of the heterogeneous unit 170 to execute the task and the processing order of functions or the type of a function included in the task, with respect to at least one task determined to be processed by the heterogeneous unit 170. For example, the electronic device 102 may determine the core of the heterogeneous unit 170 to execute the task and the processing order of functions or a the type of a function included in the task according to a dependency between tasks and the degree of delay due to a function execution.

According to another embodiment of the present disclosure, the electronic device 102 may redistribute the source code of the task into a kernel function executed by the heterogeneous unit 170 according to the determined processing order of functions or the type of a function. For example, a redistribution to the kernel function executed by the heterogeneous unit 170 may be implemented through a standardized language that the heterogeneous unit 170 supports. For example, when the heterogeneous unit 170 corresponds to a GPU, the electronic device 102 may redistribute the source code of the task into the kernel function through OpenCL.

According to another embodiment of the present disclosure, the electronic device 102 may redistribute the source code of the task into a kernel function executed by the heterogeneous unit 170 based on a table storing a kernel function that is matched to the source code of the CPU 120.

According to another embodiment of the present disclosure, the electronic device 102 may compare a ratio that an execution time of a corresponding job step occupies in the total execution time of the job with a specified ratio. Based on a comparison result, the electronic device 102 may determine a job step occupying a ratio (for example, an execution time of less than a specified time) of less than a specified size or occupying a ratio (for example, an execution time of more than a specified time) of more than a specified size, as the at least one job step to be parallelized.

According to another embodiment of the present disclosure, the electronic device 102 may compare an execution time taken when a corresponding job step is executed by the CPU 120 with an execution time taken when a corresponding job step is executed by the heterogeneous unit 170. Based on a comparison result, the electronic device 102 may determine a unit to process each unit data among the CPU 120 and the heterogeneous unit 170.

According to another embodiment of the present disclosure, the electronic device 102 may compare a result of the job obtained through the parallelization with a result of the job obtained before the parallelization. Based on a comparison result, the electronic device 102 may adjust the processing order of functions or a type of a function included in the task.

According to another embodiment of the present disclosure, the electronic device 102 may compare a result of the job obtained by using a first heterogeneous unit with a result of the job obtained by using a second heterogeneous unit through the heterogeneous unit 170. Based on a comparison result, the electronic device 102 may adjust the processing order of functions or a type of a function included in the task.

According to another embodiment of the present disclosure, the electronic device 102 may check a total execution time and current consumption amount taken when the electronic device 100 executes the job obtained through the parallelization. Based on the confirmed total execution time and current consumption amount, the electronic device 102 may adjust the processing order of functions or a type of a function included in the task.

The above-mentioned external device may include all electronic devices communicable with the electronic device 100, for example, a mobile phone, a smartphone, a notebook computer, a digital broadcast terminal, a digital camera, a portable game terminal, a Personal Digital Assistant (PDA), a Portable Multimedia Player (PMP), a navigation, or a tablet PC.

An external device (for example, the electronic device 102 or the server 104) may receive information on at least one job step determined to be parallelized from the electronic device 100. Alternatively, an external device (for example, the electronic device 102 or the server 104) may receive, from the electronic device 100, information on at least part of unit data or at least part of a task determined to be executed on each of the CPU 120 and the heterogeneous unit 170 in a job step determined to be parallelized. An external device (for example, the electronic device 102 or the server 104) may perform the parallelization of the electronic device 100 based on information received from the electronic device 100.

On the other hand, an external device (for example, the electronic device 102 or the server 104) may transmit information on at least one job step determined to be parallelized to the electronic device 100. Alternatively, an external device (for example, the electronic device 102 or the server 104) may transmit, to the electronic device 100, information on at least part of unit data or at least part of a task determined to be executed on each of the CPU 120 and the heterogeneous unit 170 in a job step determined to be parallelized. The electronic device 100 may perform parallelization based on information received from an external device (for example, the electronic device 102 or the server 104).

Since it is possible for an external device (for example, the electronic device 102 or the server 104) to be implemented to have relatively few constrains of hardware specification, the external device may more rapidly and accurately perform the profiling or the analysis of a job step of parallelization using an analysis algorithm of the electronic device 100 (for example, compared to the electronic device 100).

Figure 2:
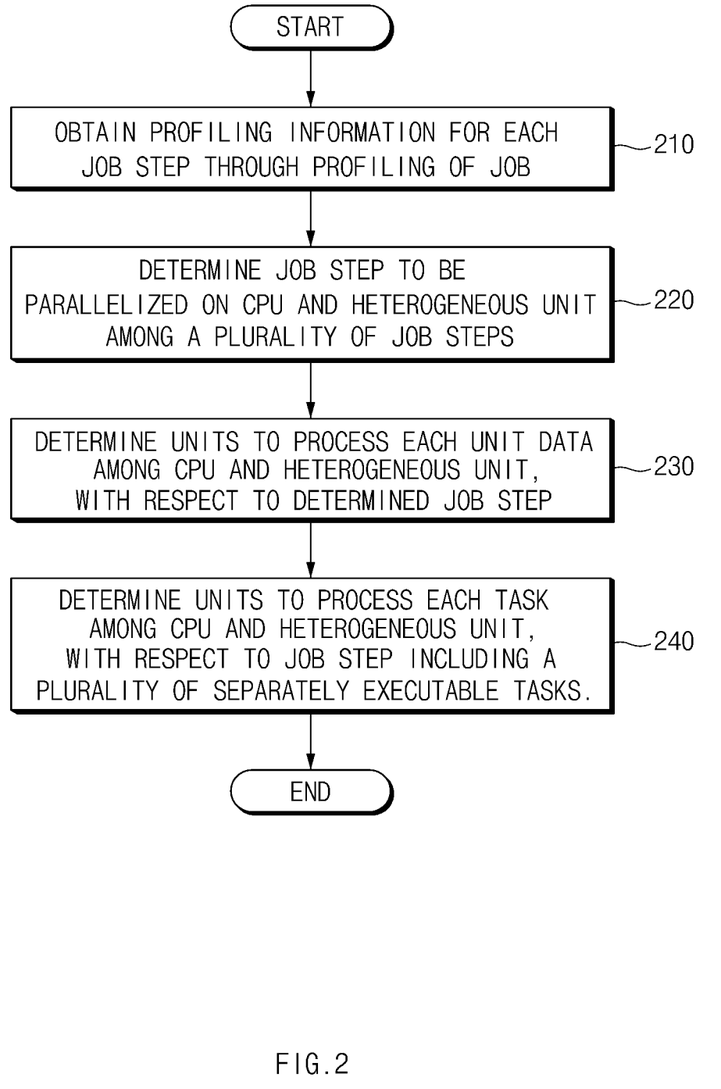
FIG. 2 is a flowchart illustrating a parallelization method according to various embodiments of the present disclosure.

FIG. 2 is a flowchart illustrating a parallelization method according to various embodiments of the present disclosure.

Referring to FIG. 2, the parallelization method shown in FIG. 2 includes operations processed by the electronic device 100 or an external device (for example, the electronic device 102 or the server 104) shown in FIG. 1. Accordingly, although some content is omitted in this embodiment of the present disclosure, the above described content relating to the electronic device 100 or an external device (for example, the electronic device 102 or the server 104) shown in FIG. 1 is applied to the method shown in FIG. 2. Hereinafter, for convenience of description, it is described that the electronic device 100 performs the parallelization method.

In operation 210, the electronic device 100 may obtain profiling information for each job step through profiling of a job. For example, profiling may include software profiling. For example, profiling may include an operation for analyzing program source code or a binary execution file by using a profiler. The profiler may analyze target source code by collecting information obtained during the execution of the target source code. For example, the profiler may obtain profiling information through a source code analysis (for example, measure the use of a specific instruction or a hardware interrupt in source code, or the frequency and duration of a function call). Through this, in relation to job execution, the electronic device 100 may obtain profiling information relating to a specified job step, for example, a range of executed code, an execution time, the number of times that a function is called, the number of executed functions, the number of executed condition statements, the number of branch determination statements, the number of executed repetition statements, the size of an allocated memory, and so on. For example, the profiling information may include at least one of an execution time of the job, an execution time for the each job step, a code range executed for the each job step, and a memory amount used for execution for the each job step.

In operation 220, the electronic device 100 may determine a job step to be parallelized on the CPU 120 and the heterogeneous unit 170 among a plurality of job steps. For example, the electronic device 100 may determine the at least one job step to be parallelized based on the profiling information.

According to an embodiment of the present disclosure, the electronic device 100 may determine a job step whose ratio that an execution time of a corresponding job step occupies in the total execution time of the job is greater than a specified ratio, as the at least one job step to be parallelized.

According to another embodiment of the present disclosure, the electronic device 100 may determine a job step having an execution time longer than a specified time among the plurality of job steps, as the at least one job step to be parallelized.

In addition to that, the electronic device 100 may determine the at least one job step to be parallelized based on at least one data included in profiling information.

In operation 230, the electronic device 100 may determine at least part of units to process each unit data among the CPU 120 and the heterogeneous unit 170, with respect to a job step repeated on a plurality of unit data in the determined job step. For example, the electronic device 100 may determine at least part of units to process each unit data based on the profiling information. For example, the electronic device 100 may compare an execution time taken when a corresponding job step is executed by the CPU 120 with an execution time taken when a corresponding job step is executed by the heterogeneous unit 170. Based on a comparison result, the electronic device 100 may determine at least part of units to process each unit data among the CPU 120 and the heterogeneous unit 170.

In operation 240, the electronic device 100 may determine at least part of units to process each task among the CPU 120 and the heterogeneous unit 170, with respect to a job step including a plurality of separately (or in isolation) executable tasks in the determined job step.

The electronic device 100 may determine a unit to process each task based on the profiling information. For example, the electronic device 100 may divide one job step into a plurality of separately executable tasks and may determine a unit to process each task among the CPU 120 and the heterogeneous unit 170 based on the type of an instruction included in a task, a code range of a conditional statement, a branch determination statement, and a repetition statement, whether there is a hardware interruption, the number of functions, and the frequency and duration of a function call.

According to an embodiment of the present disclosure, the electronic device 100 may further include an operation for determining the core of the heterogeneous unit 170 to execute the task and the processing order of functions or a function included in the task, with respect to at least one task determined to be processed by the heterogeneous unit 170.

For example, the electronic device 100 may include an operation for redistributing the source code of the task into a kernel function executed by the heterogeneous unit 170 according to the determined processing order of functions or function. For example, the electronic device 100 may redistribute the source code of the task into a kernel function executed by the heterogeneous unit 170 by using a software pipelining algorithm.

As another example, the electronic device 100 may redistribute the source code of the task into a kernel function executed by the heterogeneous unit 170 based on a table storing a kernel function that is matched to the source code of the CPU 120.

According to another embodiment of the present disclosure, the electronic device 100 may compare a result of the job obtained through the parallelization with a result of the job obtained before the parallelization. Based on a comparison result, the electronic device 100 may include an operation for adjusting the processing order of functions or a function included in the task.

According to another embodiment of the present disclosure, the electronic device 100 may compare a result of the job obtained by using a first heterogeneous unit with a result of the job obtained by using a second heterogeneous unit through the heterogeneous unit 170. Based on a job comparison result, the electronic device 100 may include an operation for adjusting the processing order of functions or a function included in the task. Through this, despite the differences in hardware specification due to the type of the heterogeneous unit 170, the optimized performance can be derived and power consumption can be minimized.

According to another embodiment of the present disclosure, the electronic device 100 may include an operation for adjusting the processing order of functions or a function included in the task based on a total execution time and current consumption amount taken when the electronic device 100 executes the job obtained through the parallelization.

Figure 3A:
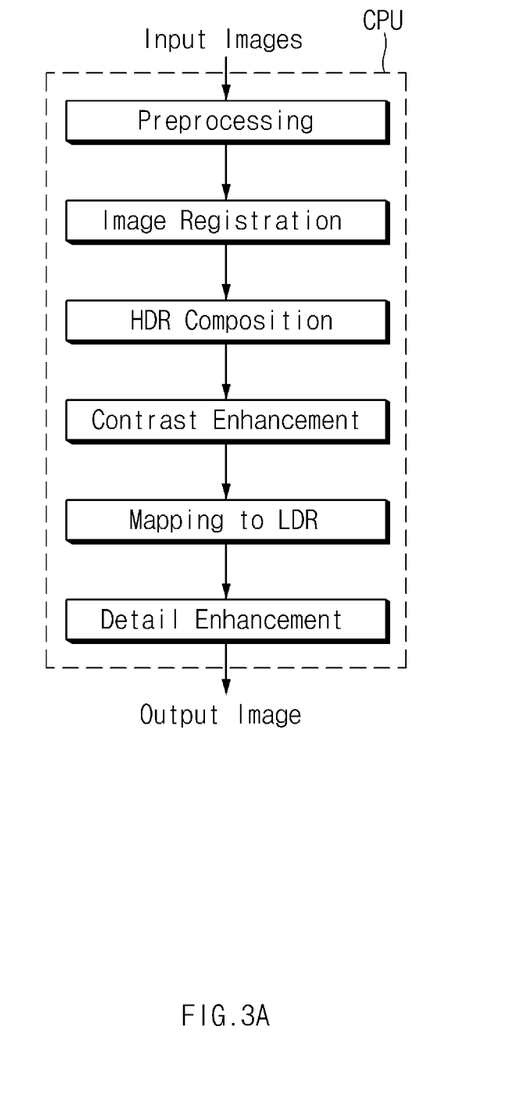
FIG. 3A is view when a parallelization method is applied to a job for generating an HDR image according to various embodiments of the present disclosure.
Figure 3B:
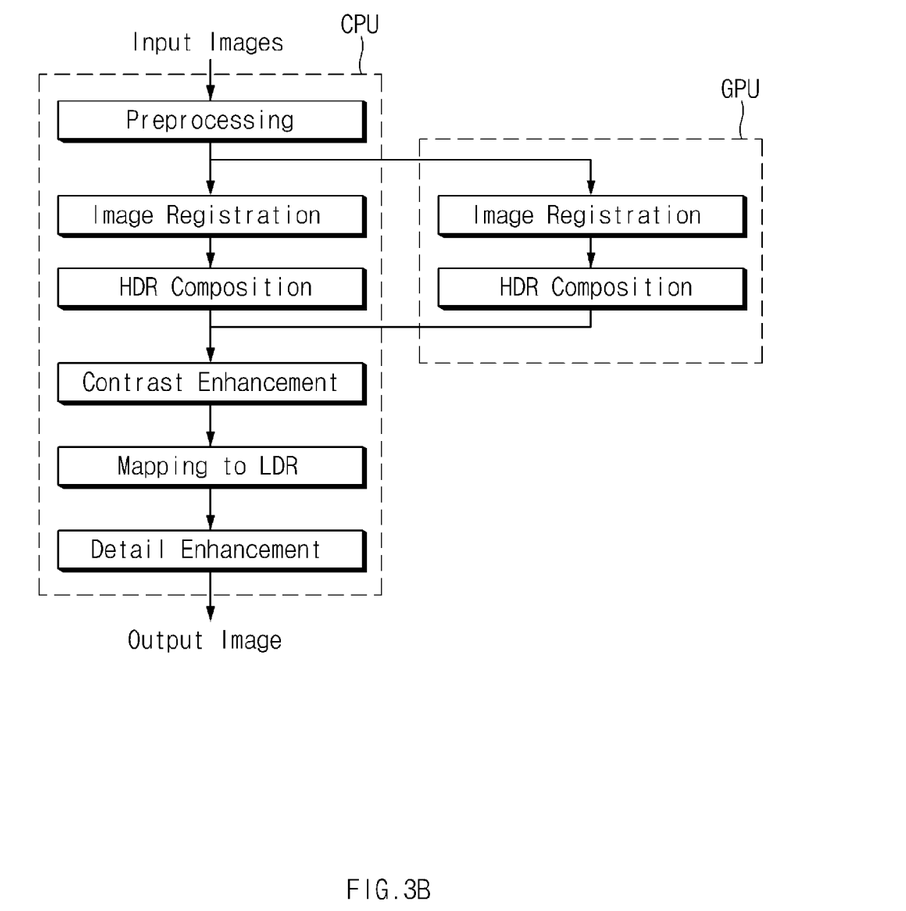
FIG. 3B is another view when a parallelization method is applied to a job for generating an HDR image according to various embodiments of the present disclosure.

FIGS. 3A and 3B are views when a parallelization method is applied to a job for generating an HDR image according to various embodiments of the present disclosure.

FIG. 3A illustrates a job for generating an HDR image before a parallelization method is applied according to an embodiment of the present disclosure.

A job for generating an HDR image (hereinafter referred to as an HDR job) is a job for generating one HDR image by compositing a plurality of images, which are obtained by capturing the same scene from different exposure environments, into one image through compensation. The HDR job may provide a greater dynamic range between the brightest portion and the darkest portion in an image in comparison to existing digital imaging techniques or photographic methods. Hereinafter, for convenience of description, the case that one HDR image is generated by synthesizing three images respectively captured from auto exposure, short exposure, and long exposure environments is described exemplarily.

According to an embodiment of the present disclosure, the electronic device 100 may receive three images respectively captured from auto exposure, short exposure, and long exposure environments. The electronic device 100 may execute a preprocessing job step for each of the received three images. For example, during the preprocessing job step, the electronic device 100 may perform image format conversion or image classification on each of the three images. For example, the electronic device 100 may convert images captured in various image formats into an image format corresponding to an image processing unit. For example, the electronic device 100 may convert images into RGB format or YUV format. Alternatively, the electronic device 100 may classify the three images depending on an exposure degree by using an average intensity of the three images.

Then, the electronic device 100 may execute a job step of image registration for estimating an artifact caused by global shift in three images captured from various exposure environments and compensating for the artifact in a pixel level. For example, during the job step of the image registration, the electronic device 100 may perform HDR align compensation and estimation. The electronic device 100 may extract features from images and match the extracted features. Additionally, the electronic device 100 may select one reference image and estimate shifts of other images with respect to the reference image. For example, the electronic device may estimate shifts of images by matching features extracted from an image.

The electronic device 100 may perform a job step of HDR composition for compositing three images, which are compensated during the job step of the image registration, into one HDR image. For example, the electronic device 100 may reduce ghosting effect by computing a motion map and a weight map during the job step of the HDR composition. By this, one HDR image may be generated.

The electronic device 100 may perform a job step of contrast enhancement on the generated HDR image. The electronic device 100 may perform a job step of mapping to low dynamic range (LDR) for mapping the HDR image to an LDR image to be stored in the memory 130 or display it on the display 150. According to an application for executing the HDR job, the HDR image may be stored in the memory 130 or may be displayed on the display 150.

Lastly, the electronic device 100 may execute a job step of detail enhancement for sharpening an image by using masking and so on. For example, details of an HDR image may be sharpened through an unsharp masking method.

FIG. 3B illustrates a job for generating an HDR image after a parallelization method is applied according to an embodiment of the present disclosure.

The electronic device 100 may obtain profiling information for each job step of the HDR job through profiling. For example, the electronic device 100 may determine a job step having the longest execution time in computing among a plurality of job steps, as the at least one job step to be parallelized. Alternatively, the electronic device 100 may determine a job step whose ratio that an execution time of a corresponding job step occupies in the total execution time of the job is greater than a specified ratio, as the at least one job step to be parallelized. For example, the electronic device 100 may determine to parallelize the job steps of the image registration and the HDR composition among a plurality of job steps of the HDR job, based on profiling information for each job step of the HDR job.

The electronic device 100 may determine the CPU 120 and the heterogeneous unit 170 to perform parallelization and processing simultaneously, with respect to a job step repeated on a plurality of unit data in the job step of the image registration. For example, since the job step of the image registration is preformed on each of three images, the electronic device 100 may determine at least part of the three images to be processed by one of the CPU 120 and the heterogeneous unit 170 based on the profiling information.

The electronic device 100 may determine a unit to process each unit data among the CPU 120 and the heterogeneous unit 170 based on a comparison of an execution time taken when a corresponding job step is executed by the CPU 120 and an execution time taken when a corresponding job step is executed by the heterogeneous unit 170. For example, the electronic device 100 may determine the CPU 120 to process two images and the heterogeneous unit 170 to process one image rather than the CPU 120 performed image registration on all the three images.

Alternatively, the electronic device 100 may determine the CPU 120 and the heterogeneous unit 170 to perform parallelization and processing simultaneously, with respect to at least one job step including the plurality of separately executable tasks in the job step of the image registration. For example, it may be determined that the CPU 120 and the heterogeneous unit 170 respectively parallelize and process edge histogram and compensation corresponding to a task of at least part of the job step of the image registration.

The electronic device 100 may determine the core of the heterogeneous unit 170 to execute the task and the processing order of functions or a function included in the task, with respect to at least one task determined to be processed by the heterogeneous unit 170. The electronic device 100 may redistribute the source code of the task into a kernel function executed by the heterogeneous unit 170 according to the determined processing order of the functions or function. The electronic device 100 may redistribute the source code of the task into a kernel function executed by the heterogeneous unit 170 based on a table storing a kernel function that is matched to the source code of the CPU 120.

According to an embodiment of the present disclosure, the electronic device 100 may adjust the processing order of functions or a function included in the task based on a comparison of a result of the HDR job obtained through the parallelization and a result of the HDR job obtained before the parallelization. Until the performance of specified criteria is obtained, a process for adjusting the processing order of functions or a function included in the task may be repeated. For example, the electronic device 100 may replace a multiplication operation (*) included in source code with a fast shift operation (<<).

According to another embodiment of the present disclosure, the electronic device 100 may adjust the processing order of functions or a function included in the task based on a comparison of a result of the job obtained by using a first heterogeneous unit and a result of the job obtained by using a second heterogeneous unit through the heterogeneous unit 170. For example, since parallelized performance varies slightly according to the type of the heterogeneous unit 170 or hardware specification, the processing order of functions or a function included in the task may be adjusted to correspond to the type or hardware specification of each heterogeneous unit 170. Accordingly, a parallelized result may be optimized for each heterogeneous unit 170. Until the performance of specified criteria is obtained, a process for adjusting the processing order of functions or a function included in the task may be repeated.

According to another embodiment of the present disclosure, the electronic device 100 may adjust the processing order of functions or a function included in the task based on a total execution time and current consumption amount taken when the electronic device 100 executes the job obtained through the parallelization. Until the performance of specified criteria is obtained, a process for adjusting the processing order of functions or a function included in the task may be repeated.

Figure 4A:
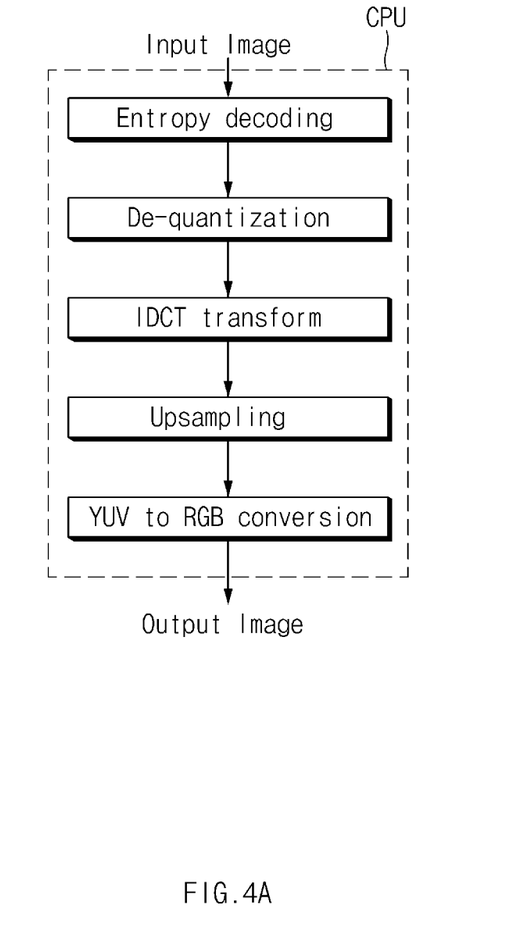
FIG. 4A is view when a parallelization method is applied to a job for performing JPEG decoding according to various embodiments of the present disclosure.
Figure 4B:
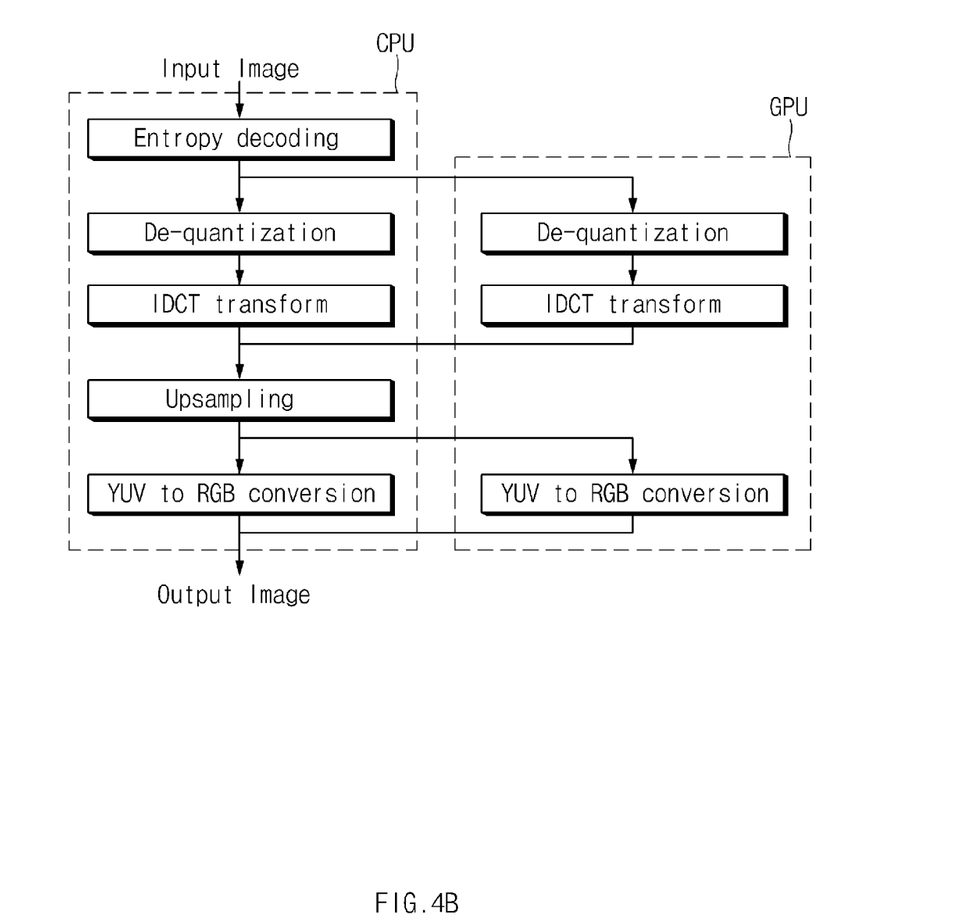
FIG. 4B is another view when a parallelization method is applied to a job for performing JPEG decoding according to various embodiments of the present disclosure.

FIGS. 4A and 4B are views when a parallelization method is applied to a job for performing JPEG decoding according to various embodiments of the present disclosure.

FIG. 4A illustrates a job for performing JPEG decoding before a parallelization method is applied according to an embodiment of the present disclosure.

A job for performing JPEG decoding (hereinafter referred to as a JPEG decoding job) is a job for dividing one image into several unit blocks and performing JPEG decoding on each unit block.

According to an embodiment of the present disclosure, the electronic device 100 may perform a job step of entropy decoding on each unit block. The electronic device 100 may perform a job step of de-quantization on each unit block. The electronic device 100 may perform a job step of inverse discrete cosine transform (IDCT) on each unit block. The electronic device 100 may perform a job step of upsampling on each unit block. The electronic device 100 may perform a job step of YUV to RGB conversion on each unit block.

FIG. 4B illustrates a job for performing JPEG decoding after a parallelization method is applied according to an embodiment of the present disclosure.

The electronic device 100 may obtain profiling information for each job step of the JPEG decoding job through profiling. For example, the electronic device 100 may determine a job step having the longest execution time (or an execution time of more than a specified time) in computing among a plurality of job steps of the JPEG decoding job. Alternatively, the electronic device 100 may determine a job step (or a smaller job step) whose ratio that an execution time of a corresponding job step occupies in the total execution time of the JPEG decoding job is greater than a specified ratio, as the at least one job step to be parallelized. For example, the electronic device 100 may determine to parallelize a job step of dequantization or a job step of inverse discrete cosine transform (IDCT) among a plurality of job steps of the JPEG decoding job, based on profiling information for each job step of the JPEG decoding job.

The electronic device 100 may perform each of job steps on a plurality of unit blocks where one image is divided. The electronic device 100 may determine the CPU 120 and the heterogeneous unit 170 to perform parallelization and processing simultaneously, with respect to at least one job step repeated on a plurality of unit blocks.

For example, the electronic device 100 may determine the CPU 120 to execute some unit blocks and the heterogeneous unit 170 to process some unit blocks, based on the profiling information. The electronic device 100 may determine a unit to process each unit block among the CPU 120 and the heterogeneous unit 170 based on a comparison of an execution time taken when a corresponding job step is executed by the CPU 120 and an execution time taken when a corresponding job step is executed by the heterogeneous unit 170.

Alternatively, the electronic device 100 may determine the CPU 120 and the heterogeneous unit 170 to perform parallelization and processing simultaneously, with respect to at least one job step including the plurality of separately executable tasks.

Figure 5:
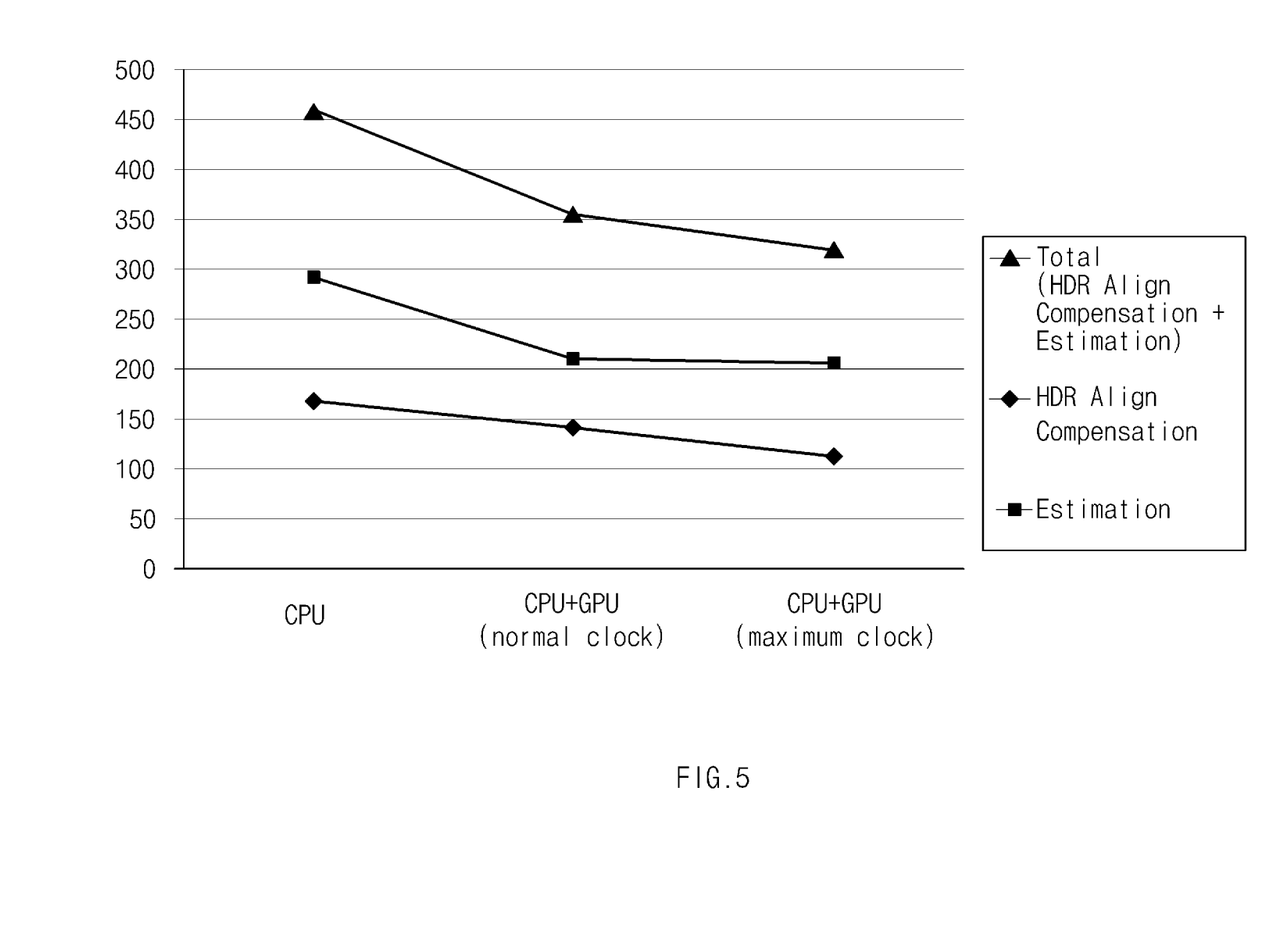
FIG. 5 is a graph showing performance improvement after a parallelization method is applied to a job for generating an HDR image according to various embodiments of the present disclosure.

FIG. 5 is a graph showing performance improvement after a parallelization method is applied to a job for generating an HDR image according to various embodiments of the present disclosure. The electronic device 100 may determine the CPU 120 and the heterogeneous unit 170 to perform parallelization and processing simultaneously, with respect to at least one job step including the plurality of separately executable tasks in the job step of the image registration. For example, it may be determined that the CPU 120 and the heterogeneous unit 170 respectively parallelize and process HDR align compensation and estimation corresponding to a task of at least part of the job step of the image registration.

The graph shows an execution time taken for performing HDR align compensation and estimation corresponding to a task of at least part of a job step of image registration by using at least one of a CPU and a GPU. Referring to the graph of FIG. 5, an execution time taken for performing a job step by using only a CPU, an execution time taken for performing a job step by using the parallelization of a CPU and a GPU at a basic clock frequency, and execution times taken for performing a job step by using the parallelization of a CPU and a GPU at the maximum clock frequency may be compared. Referring to FIG. 5, when the electronic device 100 parallelizes a CPU and a GPU at the maximum clock frequency, the maximum performance improvement can be achieved.

Table 1 is data showing the performance improvement after a parallelization method is applied to a job for generating an HDR image according to various embodiments of the present disclosure.

TABLE 1

|  | Consumed time (ms) | Increase/ Decrease (%) | Battery consumption amount (mA) | Increase/ Decrease (%) |
| --- | --- | --- | --- | --- |
| CPU version (existing) | 1015 ms |  | 3709 mA |  |
| CPU + GPU(normal clock) | 837 ms | 18% ↑ | 3707 mA | 20% ↓ |
| CPU + GPU(maximum clock) | 775 ms | 24% ↑ | 2856 mA | 23% ↓ |

When execution times before and after a parallelization method is applied are compared, it shows that an execution time is reduced as an execution time is 1015 ms in an existing CPU version but 847 ms at a basic clock frequency in a CPU+GPU version. Additionally, it shows that an execution time can be reduced to 775 ms in the CPU+GPU version of the maximum clock frequency. In comparison to existing CPU code, in terms of execution time, it shows that the performance improvement of 18% can be achieved at a basic clock frequency and 24% at the maximum clock frequency.

When battery consumption amounts before and after a parallelization method is applied are compared, it shows that a battery consumption amount can be reduced as a battery consumption amount is 3709 mA in an existing CPU version but 2967 mA at a basic clock frequency. Additionally, it shows that a battery consumption amount can be reduced to 2856 mA in the CPU+GPU version of the maximum clock frequency. In comparison to existing CPU code, in terms of execution time, it shows that the performance improvement of 20% can be achieved at a basic clock frequency and 23% at the maximum clock frequency.

A parallelization method and an electronic device according to various embodiments of the present disclosure parallelize part of code executed on a multi-core CPU to be simultaneously executed on a heterogeneous unit under heterogeneous environment so that CPU load can be reduced and heat generation amount and power consumption can be minimized.

Each of the above-mentioned components of the electronic device according to various embodiments of the present disclosure may be configured with at least one component and the name of a corresponding component may vary according to the kind of an electronic device. An electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the AP 210) executes an instruction, it may perform a function corresponding to the instruction. The non-transitory computer-readable storage media may include the memory 230, for example. At least part of a programming module may be implemented (for example, executed) by the AP 210, for example. At least part of a programming module may include a module, a program, a routine, sets of instructions, or a process to perform at least one function, for example.

The computer-readable storage media may include Magnetic Media such as a hard disk, a floppy disk, and a magnetic tape, Optical Media such as Compact Disc Read Only Memory (CD-ROM) and Digital Versatile Disc (DVD), Magneto-Optical Media such as Floptical Disk, and a hardware device especially configured to store and perform a program instruction (for example, a programming module) such as Read Only Memory (ROM), Random Access Memory (RAM), and flash memory. Additionally, a program instruction may include high-level language code executable by a computer using an interpreter in addition to machine code created by a complier. The hardware device may be configured to operate as at least one software module to perform an operation of various embodiments and vice versa.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

Also, embodiments of the present disclosure disclosed in this specification and drawings are provided as specific examples to describe technical content and help understanding and also do not limit the scope of the present disclosure. Accordingly, it should be construed that besides the embodiments listed herein, all modifications or modified forms derived based on the technical ideas of the present disclosure are included in the scope of the present disclosure.

What is claimed is:

1. A parallelization method comprising:
   obtaining, by an electronic device, profiling information for each job step of a job to be executed on the electronic device by performing profiling of the job;
   determining, by the electronic device, at least one job step of the job to be parallelized on a central processing unit (CPU) and at least one heterogeneous unit of the electronic device among a plurality of job steps of the job based on the profiling information;
   determining, by the electronic device, at least parts of units to process each unit data among the CPU and the at least one heterogeneous unit of the electronic device based on the profiling information in the determined at least one job step of the job; and
   determining, by the electronic device, at least parts of units to process each task among the CPU and the at least one heterogeneous unit of the electronic device based on the profiling information, with respect to the at least one job step of the job including a plurality of separately executable tasks in the determined at least one job step of the job,
   wherein the determining of the at least one job step of the job to be parallelized comprises determining, by the electronic device, a job step of the job whose ratio that an execution time of a corresponding job step of the job occupies in a total execution time of the job is more or less than a specified ratio, as the at least one job step of the job to be parallelized.

2. The parallelization method of claim 1, further comprising determining, by the electronic device, a core of the at least one heterogeneous unit of the electronic device to execute the task and a processing order of functions or a type of a function included in the task, with respect to at least one task determined to be processed by the at least one heterogeneous unit of the electronic device.

3. The parallelization method of claim 2, further comprising redistributing, by the electronic device, source code of the task into a kernel function executed on the at least one heterogeneous unit of the electronic device according to the determined processing order of the functions or the type of the function included in the task.

4. The parallelization method of claim 3, wherein the redistributing of the source code of the task comprises redistributing, by the electronic device, the source code of the task into the kernel function executed on the at least one heterogeneous unit of the electronic device based on a table storing a kernel function matched to source code of the CPU.

5. The parallelization method of claim 2, further comprising adjusting, by the electronic device, the processing order of the functions or the type of the function included in the task based on a comparison of a result of the job obtained through the parallelization method and a result of the job obtained before the parallelization method.

6. The parallelization method of claim 2, further comprising adjusting, by the electronic device, the processing order of the functions or the type of the function included in the task based on a comparison of a result of the job obtained by using a first heterogeneous unit and a result of the job obtained by using a second heterogeneous unit through the at least one heterogeneous unit of the electronic device.

7. The parallelization method of claim 2, further comprising adjusting, by the electronic device, the processing order of the functions or the type of the function included in the task based on a total execution time and a current consumption amount consumed for executing the job obtained through the parallelization method in the electronic device.

8. The parallelization method of claim 1, wherein the determining of the at least parts of units to process each unit data among the CPU comprises determining, by the electronic device, a unit to process each unit data among the CPU and the at least one heterogeneous unit of the electronic device based on a comparison of an execution time when the CPU executes a corresponding job step of the job and an execution time when the at least one heterogeneous unit of the electronic device executes a corresponding job step of the job.

9. The parallelization method of claim 1, wherein the profiling information comprises an execution time of the job and an execution time for the each job step of the job.

10. The parallelization method of claim 9, wherein the profiling information comprises a code range executed for the each job step of the job or a memory amount used for execution of the each job step of the job.

11. The parallelization method of claim 1, further comprising, when the job is a high dynamic range (HDR) job, based on profiling information for each job step of the HDR job, parallelizing, by the electronic device, at least one of a job step of image registration and a job step of HDR composition among a plurality of job steps of the HDR job on the CPU and the at least one heterogeneous unit of the electronic device.

12. The parallelization method of claim 1, further comprising, when the job is a JPEG decoding job, based on profiling information for each job step of the JPEG decoding job, parallelizing, by the electronic device, at least one of a job step of dequantization and a job step of inverse discrete cosine transform (IDCT) among a plurality of job steps of the JPEG decoding job on the CPU and the at least one heterogeneous unit of the electronic device.

13. The parallelization method of claim 1, wherein at least part of the at least one heterogeneous unit of the electronic device comprises a heterogeneous computing processing unit.

14. The parallelization method of claim 1, wherein the at least one heterogeneous unit of the electronic device comprises at least one graphics processing unit (GPU).

15. An electronic device comprising:
a central processing unit (CPU) configured to process at least parts of unit data and execute at least part of a task determined to be processed on the CPU in at least one job step of a job to be parallelized, which is determined based on profiling information obtained for the at least one job step of the job to be parallelized; and
at least one heterogeneous unit configured to process at least parts of unit data and execute at least part of a task determined to be processed on the at least one heterogeneous unit in the at least one job step of the job to be parallelized,
wherein the at least part of the task executed on each of the CPU and the at least one heterogeneous unit is determined with respect to the at least one job step of the job to be parallelized including a plurality of separately executable tasks in the determined at least one job step of the job to be parallelized, and
wherein the at least one job step of the job to be parallelized comprises determining a job step of the job whose ratio that an execution time of a corresponding job step of the job occupies in a total execution time of the job is more or less than a specified ratio, as the at least one job step of the job to be parallelized.

16. The electronic device of claim 15, wherein, when the job is a high dynamic range (HDR) job, the CPU and the at least one heterogeneous unit parallelize at least one of a job step of image registration and a job step of HDR composition among a plurality of job steps of the HDR job.

17. The electronic device of claim 15, wherein, when the job is a JPEG decoding job, the CPU and the at least one heterogeneous unit parallelize at least one of a job step of dequantization and a job step of inverse discrete cosine transform (IDCT) among a plurality of job steps of the JPEG decoding job.

18. The electronic device of claim 15, wherein at least part of the at least one heterogeneous unit comprises a heterogeneous computing processing unit.

19. The electronic device of claim 15, wherein the at least one heterogeneous unit comprises at least one graphics processing unit (GPU).

* * * * *